United States Patent
Hatayama

(10) Patent No.: US 12,227,640 B2
(45) Date of Patent: Feb. 18, 2025

(54) POLYESTER POLYMER COMPOSITIONS

(71) Applicant: SOLVAY SPECIALTY POLYMERS USA, LLC, Alpharetta, GA (US)

(72) Inventor: Toshio Hatayama, Tokyo (JP)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 0 days.

(21) Appl. No.: 16/621,353

(22) PCT Filed: Jun. 12, 2018

(86) PCT No.: PCT/EP2018/065527
§ 371 (c)(1),
(2) Date: Dec. 11, 2019

(87) PCT Pub. No.: WO2018/229062
PCT Pub. Date: Dec. 20, 2018

(65) Prior Publication Data
US 2021/0139694 A1    May 13, 2021

Related U.S. Application Data

(60) Provisional application No. 62/518,875, filed on Jun. 13, 2017.

(51) Int. Cl.
| | | |
|---|---|---|
| C08L 67/02 | (2006.01) | |
| C08G 63/183 | (2006.01) | |
| C08K 3/22 | (2006.01) | |
| C08K 3/30 | (2006.01) | |
| C08K 3/32 | (2006.01) | |
| C08K 5/00 | (2006.01) | |
| C08K 7/14 | (2006.01) | |

(52) U.S. Cl.
CPC ............ *C08L 67/02* (2013.01); *C08G 63/183* (2013.01); *C08K 3/22* (2013.01); *C08K 3/30* (2013.01); *C08K 3/32* (2013.01); *C08K 5/005* (2013.01); *C08K 7/14* (2013.01); *C08K 2003/2241* (2013.01); *C08K 2003/2296* (2013.01); *C08K 2003/3036* (2013.01); *C08K 2003/3045* (2013.01); *C08K 2003/325* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 6,048,626 A | 4/2000 | Tsuzuki et al. | |
| 6,287,530 B1 | 9/2001 | Aoyama et al. | |
| 7,893,141 B2 | 2/2011 | De Wit et al. | |
| 2006/0074155 A1* | 4/2006 | Wit | C08K 3/32 524/115 |
| 2014/0187662 A1* | 7/2014 | Lee | C08L 77/06 522/63 |
| 2014/0191263 A1* | 7/2014 | Wang | C08L 67/02 524/413 |
| 2015/0049492 A1 | 2/2015 | Schellekens et al. | |
| 2015/0152241 A1 | 6/2015 | Hong et al. | |

FOREIGN PATENT DOCUMENTS

| | | |
|---|---|---|
| CN | 1239491 A | 12/1999 |
| CN | 1242028 A | 1/2000 |
| CN | 103160079 A | 6/2013 |
| CN | 103911000 A | 7/2014 |
| EP | 2634211 A1 | 9/2013 |
| JP | 2010106177 A | 5/2010 |
| JP | 2011021128 A | 2/2011 |

OTHER PUBLICATIONS

Murphy J., in "Additives for Plastics Handbook", 2nd Edition, 2001, Chapter 5.2.3., p. 43-48—Elsevier Advanced Technology.

* cited by examiner

*Primary Examiner* — Robert T Butcher
(74) *Attorney, Agent, or Firm* — Osha Bergman Watanabe & Burton LLP

(57) ABSTRACT

Described herein are polyester polymer compositions including a polyester polymer, a white pigment and hydroxyapatite. It was surprisingly discovered that polyester polymer compositions including hydroxyapatite maintain outstanding retention of reflectance after prolonged exposure to heat and light, while having significantly reduced microblistering and increased mechanical performance relative to analogous polyester polymer compositions including a non-calcium phosphate salt. Accordingly, in some embodiments, the polymer compositions can be desirably incorporated into light emitting diode ("LED") components.

12 Claims, 1 Drawing Sheet

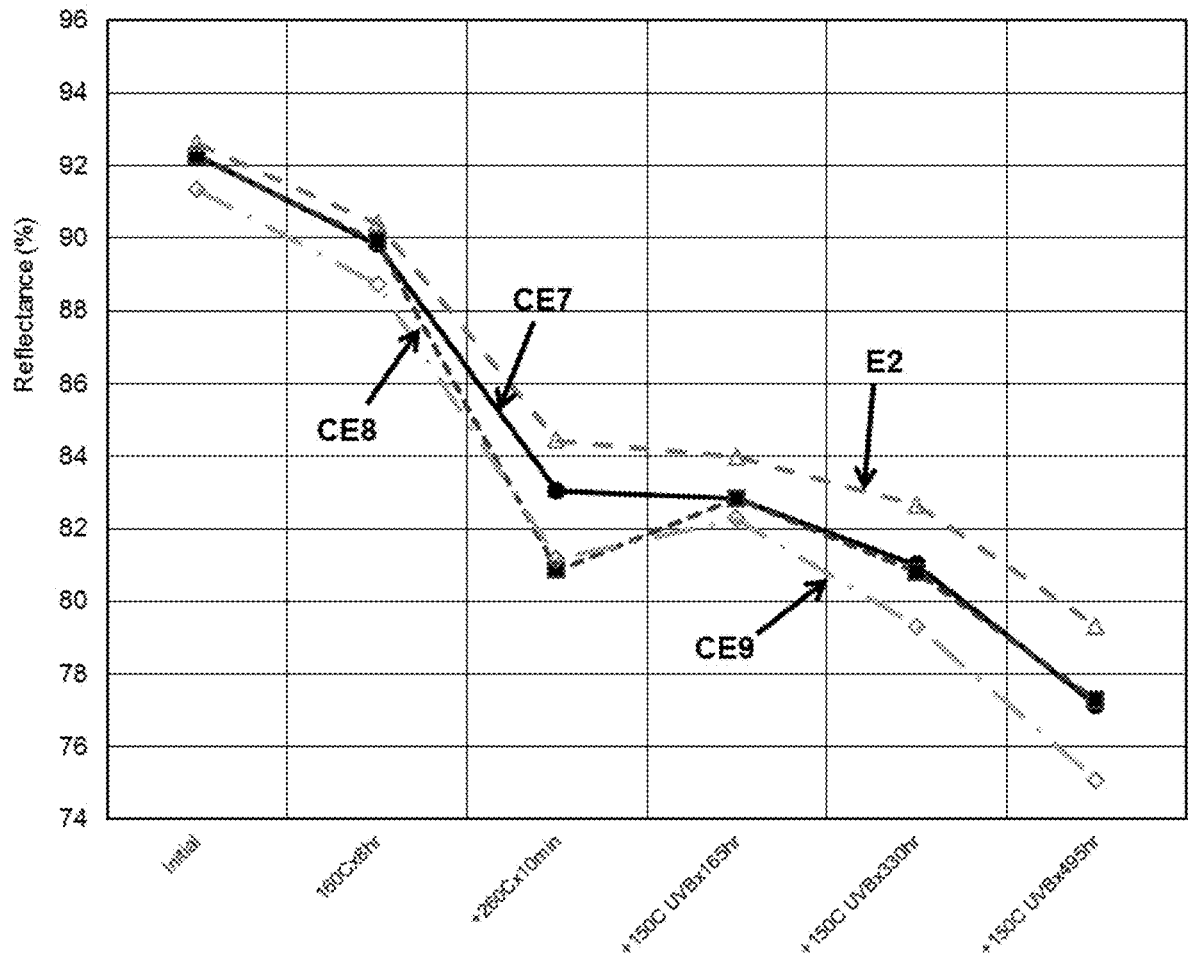

POLYESTER POLYMER COMPOSITIONS

CROSS REFERENCE TO RELATED APPLICATIONS

This application is a national stage entry of PCT/EP2018/065527 filed on Jun. 12, 2018, which claims priority to U.S. provisional patent application No. 62/518,875 filed Jun. 13, 2017, the whole content of this application being incorporated herein by reference for all purposes.

TECHNICAL FIELD OF THE INVENTION

The invention relates to polyester polymer compositions including a polyester polymer and hydroxyapatite. The invention further relates to light-emitting diode components containing the polyester polymer compositions.

BACKGROUND OF THE INVENTION

Light emitting diode components, such as housings, reflectors, reflector cups and reflector plates require an especially demanding combination of excellent reflectance and thermal and light stability. Ceramics may be advantageously used in light emitting diode components, but are extremely costly and require demanding processing technologies. Therefore, polymer compositions have been extensively studied and developed to replace ceramics as a lower cost material.

SUMMARY

A polyester polymer composition is provided. The polyester polymer composition comprises a polyester polymer; 1 wt. % to 50 wt. % of a white pigment; and 0.5 wt. % to 25 wt. % hydroxyapatite; wherein wt. % is relative to the total weight of the polyester polymer composition.

An LED housing comprising the polyester polymer composition is also provided, as is an article comprising the LED housing. The article is selected from the group consisting of a cellular telephone display, an automotive display and a laptop computer display.

BRIEF DESCRIPTION OF THE DRAWINGS

The FIGURE is a graph containing plots of percent reflectance vs. aging time for several different polyester polymer compositions.

DETAILED DESCRIPTION OF THE INVENTION

Described herein are polyester polymer compositions including a polyester polymer, a white pigment and hydroxyapatite. It was surprisingly discovered that polyester polymer compositions including hydroxyapatite ($3Ca_3(PO_4)_2$—$Ca(OH)_2$) maintain outstanding retention of reflectance after prolonged exposure to heat and light, while having significantly reduced microblistering (due to moisture absorption) and increased mechanical performance relative to analogous polyester polymer compositions including a non-calcium phosphate salt ("corresponding polyester polymer composition"). Accordingly, in some embodiments, the polymer compositions can be desirably incorporated into light emitting diode ("LED") components.

LED applications require polymer compositions with outstanding reflective properties and heat and light stability. When incorporated into LED application settings, the polymer compositions are exposed to high temperatures and light intensities. For example, LED components are exposed to elevated temperatures during the manufacturing process. For example, during the fabricating steps the LED components are heated to about 180° C. to cure an epoxy or silicon encapsulant. The LED components are also exposed to temperatures above 260° C. while soldering operations are performed. In addition, while in use, LED components, such as automobile components, are routinely subjected to temperatures above 80° C. This exposure to high temperatures causes yellowing of polymer compositions used for forming LED components. Similarly, because LEDs can provide for high intensity light emission, the polymer composition is generally exposed to such light over the lifetime of the LED component. Due to prolonged exposure to elevated temperatures and intense light radiation, the polymer composition can yellow, resulting from its deterioration. Accordingly, the concomitant deterioration of the LED component can cause the LED devices to suffer from light distortion and/or poor emission efficiency after exposure to high temperature and high intensity radiation (e.g. poor retention of reflectance). Furthermore, moisture absorption (e.g. from ambient moisture in the air) can cause microblisters of the polymer composition, further reducing the reflectance and significantly degrading mechanical performance of the LED component made from the polymer composition. Microblisters range in size from 10 μm to 100 μm in diameter. Without being limited by a theory, it is believed that inorganic additives included in polyester compositions to aid in retention of reflectance easily absorb moisture. The absorbed moisture can form microblisters in the polymer composition at room temperature. Elevated temperatures (e.g. during molding or use as an LED component) exacerbates the problem by accelerating the rate of moisture absorption and the rate of microblister formation.

While sodium phosphate salts are traditionally incorporated into polyester polymer compositions to improve the heat and light aging performance (e.g., degree of yellowing and polymer degradation during exposure to heat and light), such solutions have significant drawbacks with respect to moisture absorption. For example, US patent application publication number US 2014/0187662, to Lee et al., discloses use the use of sodium phosphate salts in thermoplastic resin compositions to improve anti-yellowing properties. Similarly, US patent application publication number US 2015/0152241, to Hong et al., discloses the use of sodium phosphate salts to improve the discoloration resistance and high temperature stability of thermoplastic resin compositions including a polyester resin. However, as demonstrated in the Examples below, polyester polymer compositions including sodium phosphate salts can have significant microblistering due to moisture absorption (at both elevated and room temperature) and a corresponding decrease in the reflectivity of the polyester polymer composition.

It was surprisingly discovered that polyester polymer compositions including hydroxyapatite maintain outstanding retention of reflective after prolonged exposure to heat and light, while having significantly reduced microblister formation and increased mechanical performance relative to a corresponding polyester polymer composition. The polyester polymer composition and LED device components including the polyester polymer compositions are described below.

The Polyester Polymer

As used herein, a polyester polymer refers to any polymer containing, relative to the total number of recurring units in the polyester polymer, at least 50 mol % of a recurring unit ($R_{PE}$) which contains an ester group (—C(=O)—O—). In some embodiments, the polyester polymer includes at least 60 mol %, at least 70 mol %, at least 80 mol %, at least 90 mol %, at least 95 mol %, at least 99 mol % or at least 99.9 mol % of recurring unit ($R_{PE}$), relative to the total number of recurring units in the polyester polymer.

In some embodiments, recurring unit ($R_{PE}$) is represented by the following formula:

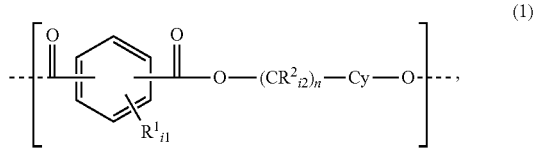

where $R^1$ and $R^2$, at each location, is independently selected from the group consisting of a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium; Cy is a bond or a substituted cycloaliphatic group containing a monovalent alkyl group and monovalent cycloaliphatic group; i1 is an integer from 0 to 4; i2, at each location, is an independently selected integer from 0 to 2; and n is an integer from 1 to 12. For clarity, a moiety substituted by i number of R groups ($R_i$), is bonded to $i^{max}-i$ R groups and i R groups, where $i^{max}$ is the maximum value of i. For example, referring to Formula (1), if n is 2 and one $i^2$ is 0 and the other $i^2$ is 1, the group —O—$(CR^2_{i2})_n$-Cy- is represented by: —O—$CH_2$—$CHR^3$—O—. As another example and again referring to Formula (1), if $i^1$ is 2, then four of the carbons on the corresponding benzyl ring are independently bonded to each of the two —CO— groups and the two independently selected $R^1$ groups, with the remaining two carbons on the corresponding benzyl ring bonded to hydrogen atoms. Analogous notation is used for other formulae herein.

In some embodiments, recurring unit ($R_{PE}$) is represented by the following formula:

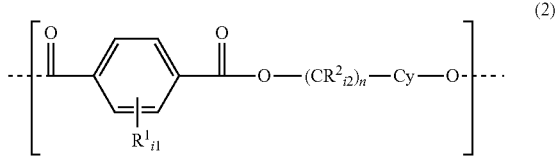

In some such embodiments, $i^1$ and $i^2$, at each location, is zero. In some embodiments, additionally, either Cy is a bond; n is 2 or 4; or both. In some embodiments, the polyester polymer is polytrimethylene terephthalate ("PTT") ($i^1$ and $i^2$, at each location, is 0; Cy is a bond; and n is 1); polyethylene terephthalate ("PET") ($i^1$ and $i^2$, at each location, is 0; Cy is a bond; and n is 2), polybutylene terephthalate ("PBT") ($i^1$ and $i^2$, at each location, is 0; Cy is a bond; and n is 4).

In some embodiments in which recurring unit ($R_{PE}$) is represented by either Formula (1) or (2), Cy is represented by the following formula:

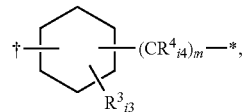

where $R^3$ and $R^4$, at each location, are independently selected from the group consisting a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine and a quaternary ammonium; $i^3$ is an integer from 0 to 10; $i^4$, at each location, is an independently selected integer from 0 to 2; and m is an integer from 1 to 12. Referring to Formula (3), "†" indicates a bond to the —$(CR^2_{i2})_n$— group in Formulae (1) and (2). Similarly, "*" indicates a bond to the —O— group in Formulae (1) and (2). In some embodiments, in which recurring unit ($R_{PE}$) is represented by either Formula (1) or (2) and Cy is represented by Formula (3), —$(CR^2_{i2})_n$— is the same as —$(CR^4_{i4})_m$—. In some such embodiments, either n=m=1; $i^2$ and $i^4$, at each location, is zero; or both.

In some embodiments, the concentration of the polyester polymer is at least 20 weight percent ("wt. %"), preferably at least 25 wt. %, most preferably at least 30 wt. %. In some embodiments, additionally or alternatively, the concentration of the polyester polymer is at most 70 wt. %, preferably at most 60 wt. %, more preferably at most 55 wt. %, even more preferably at most 50 wt. %, still more preferably at most 45 wt. %, most preferably a most 40 wt. %. As used herein, wt. % is relative to the total weight of the polyester polymer composition, unless explicitly noted otherwise.

In some embodiments, the polymer composition includes a plurality of polyester polymers, each polyester polymer including at least 50 mol % of a distinct recurring unit represented by a Formula (1) to (2) as described above. In some such embodiments, each polyester polymer independently includes at least 60 mol %, at least 70 mol %, at least 80 mol %, at least 90 mol %, at least 95 mol %, at least 99 mol % or at least 99.9 mol % of a distinct recurring unit, as described above, relative to the total number of moles of recurring units in the polyester polymer. Furthermore, the melting point of each of the distinct amorphous polyester copolymers is within the ranges described below. Moreover, in embodiments, in which the polymer composition includes a plurality of polyester polymers, the total concentration of the polyester polymers in the polyester polymer composition is within the ranges described above.

In some embodiments, the polyester polymer has an inherent viscosity of from 0.4 deciliters per gram ("dL/g") to 2.0 dL/g, preferably 0.4 dL/g to 1.4 dL/g, as measured in a 60:40 phenol/tetrachloroethane mixture or similar solvent at 30° C. according to ASTM D5225.

In some embodiments, the polyester polymer has a melting point of at least 250° C., preferably at least 260° C., more preferably at least 270° C. and most preferably at least 280° C. In some embodiments, additionally or alternatively, the polyester polymer has a melting point of at most 350° C., preferably at most 340° C., more preferably at most 330° C. and most preferably at most 320° C. Melting point can be measured using differential scanning calorimetry ("DSC") according to ISO-11357-3.

Stabilizers

In addition to the polyester polymer, the polyester polymer composition includes hydroxyapatite as a stabilizer. Optionally, the polyester polymer composition can include one or more additional stabilizers.

As noted above, it was surprisingly discovered that polyester polymer compositions including hydroxyapatite maintain outstanding retention of reflective after prolonged exposure to heat and light, while having significantly reduced moisture absorption and increased mechanical performance relative to a corresponding polyester polymer composition. In some embodiments, the concentration of the hydroxyapatite is at least 0.5 wt. %, preferably at least 1 wt. %, more preferably at least 1.5 wt. %, most preferably at least 2 wt. %. In some embodiments, additionally or alternatively, the concentration of the hydroxyapatite is no more than 25 wt. %, preferably no more than 20 wt. %, more preferably no more than 15 wt. %, even more preferably no more than 12 wt. %, most preferably no more than 10 wt. %.

In some embodiments, the polyester polymer composition is substantially free of non-calcium phosphate salts. As used herein, a polyester polymer composition substantially free of non-calcium phosphate salts has a total non-calcium phosphate salt concentration of less than 0.5 wt. %, preferably less than 0.1 wt. %, more preferably less than 0.05 wt. %, most preferably less than 0.01 wt. %. Furthermore, as used herein, non-calcium phosphate salts are phosphate salts ($PO_4^{3-}$), pyrophosphate salts ($P_2O_7^{4-}$), and monohydrogen phosphate ($HPO_4^{2-}$) salts of sodium, aluminum, barium, beryllium, magnesium, potassium and strontium, as well as pyrophosphate salts and monohydrogen phosphate salts of calcium.

In some embodiments, the polyester polymer composition optionally includes one or more stabilizers in addition to the hydroxyapatite. Each of the one or more additional stabilizers can be independently selected from the group consisting of light stabilizers and antioxidant stabilizers. Light stabilizers of interest herein include, but are not limited to, hindered amine stabilizers, benzotriazole stabilizers, triazine stabilizers, benzophenone stabilizers, cyanoacrylate stabilizers, salicylate stabilizers, and oxanilide stabilizers.

The term "hindered amine stabilizer" refers to derivatives of 2,2,6,6-tetramethyl piperidine, which are well known in the art (see for example: *Plastics Additives Handbook*, 5th ed., Hanser, 2001). The hindered amine stabilizer can be either a low molecular weight stabilizer or a high molecular weight stabilizer. The low molecular weight hindered amine stabilizers have a molecular weight of at most 900 g/mol, preferably at most 800 g/mol, more preferably of at most 700 g/mol, still more preferably at most 600 g/mol and most preferably of at most 500 g/mol g/mol. When present, the total concentration of hindered amine stabilizers is at least 0.05 wt. %, more preferably at least 0.1 wt. %, still more preferably at least 0.15 wt. %, and most preferably at least 0.2 wt. %. In some embodiments, additionally or alternatively, the total concentration of hindered amine stabilizers is at most 3.5 wt. %, preferably at most 3 wt. %, more preferably at most 2.5 wt. %, still more preferably at most 2.0 wt. %, even more preferably at most 0.8 wt. % and most preferably at most 0.6 wt. %. In some embodiments, the total concentration of hindered amine stabilizers is from 0.05 wt. % to 2 wt. %, preferably from about 0.1 wt. % to about 0.8 wt. %, most preferably from 0.2 wt. % to 0.6 wt. %.

Should the disclosure of any patents, patent applications, and publications which are incorporated herein by reference conflict with the description of the present application to the extent that it may render a term unclear, the present description shall take precedence.

Examples of low molecular weight hindered amine stabilizers are listed in Table 1 below:

TABLE 1

Examples of low molecular weight hindered amine stabilizers

| Formula | Structure |
| --- | --- |
| (a1) | |
| (a2) | |

TABLE 1-continued

Examples of low molecular weight hindered amine stabilizers

| Formula | Structure |
|---|---|
| (a3) | [chemical structure] |
| (a4) | [chemical structure] |
| (a5) | [chemical structure] |
| (a6) | [chemical structure] |
| (a7) | [chemical structure] |

TABLE 1-continued
Examples of low molecular weight hindered amine stabilizers
| Formula | Structure |
|---|---|
| | 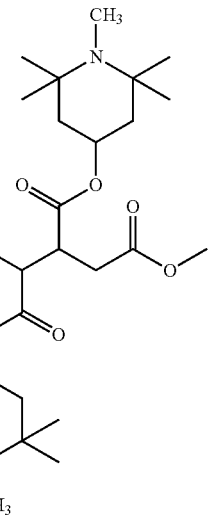 |
| (a8) | 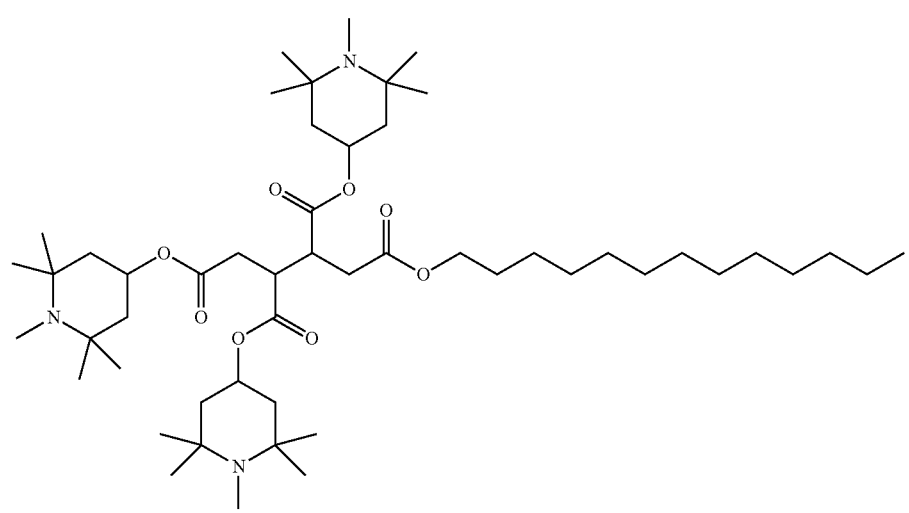 [SMILES: CCCCCCCCCCCCCOC(=O)CC(C(=O)OC1CC(C)(C)N(C)C(C)(C)C1)C(CC(=O)OC1CC(C)(C)N(C)C(C)(C)C1)C(=O)OC1CC(C)(C)N(C)C(C)(C)C1] |
| (a9) | 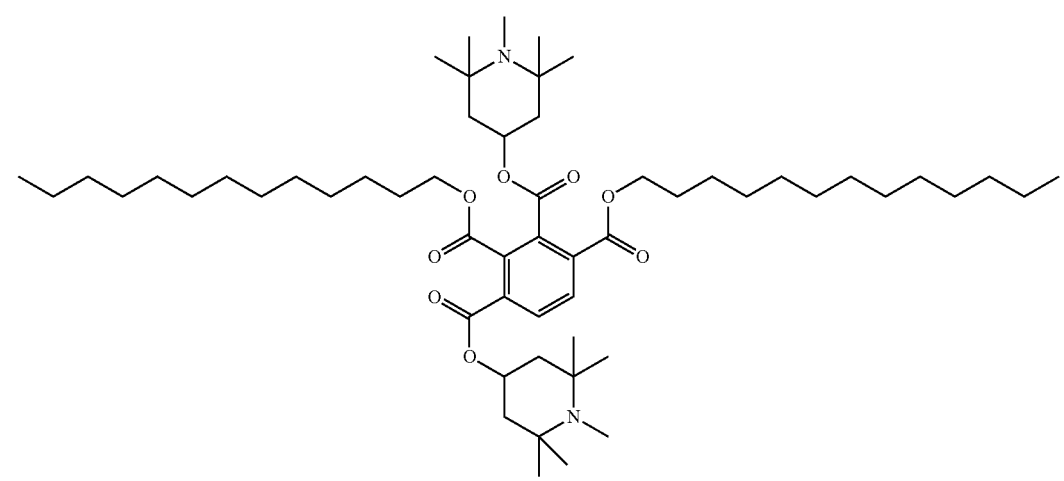 [SMILES: CCCCCCCCCCCCCOC(=O)c1ccc(C(=O)OC2CC(C)(C)N(C)C(C)(C)C2)c(C(=O)OCCCCCCCCCCCCC)c1C(=O)OC1CC(C)(C)N(C)C(C)(C)C1] |

TABLE 1-continued

Examples of low molecular weight hindered amine stabilizers

| Formula | Structure |
|---|---|
| (a10) | *(chemical structure: tetrakis(2,2,6,6-tetramethylpiperidinyl) butane-1,2,3,4-tetracarboxylate)* |
| (a11) | *(chemical structure: 2,2,6,6-tetramethylpiperidinyl ester, R = $C_{16}$-$C_{18}$)* |
| (a12) | *(chemical structure: spiro oxazolidinone with cyclododecane and tetramethylpiperidine)* |

In some embodiments, the low molecular weight hindered amine stabilizer is represented by a formula selected from the group of formulae consisting of Formulas (a1), (a2), (a11) and (a12). More preferably, the low molecular weight hindered amine stabilizer is represented by a formula selected from the group of formulae consisting of Formulas (a1), (a2), and (a12). Most preferably the low molecular weight hindered amine stabilizer is represented by Formula (a2).

Examples of high molecular weight hindered amine stabilizers are listed in Table 2 below:

TABLE 2

Examples of high molecular weight hindered amine stabilizers

| Formula | Structure |
|---|---|
| (b1) | *(chemical structure: polysiloxane with tetramethylpiperidinyl propyl side chain, repeat unit n)* |

TABLE 2-continued
Examples of high molecular weight hindered amine stabilizers
| Formula | Structure |
|---|---|
| (b2) | 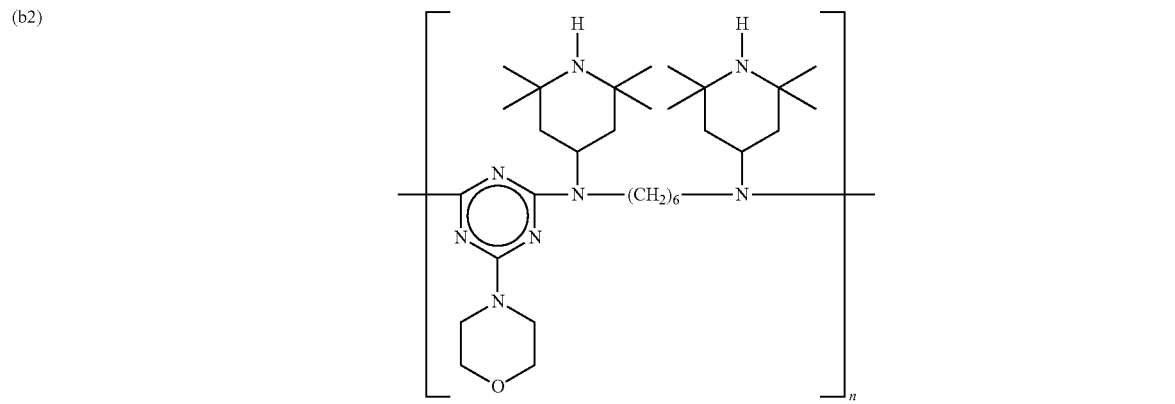 |
| (b3) | 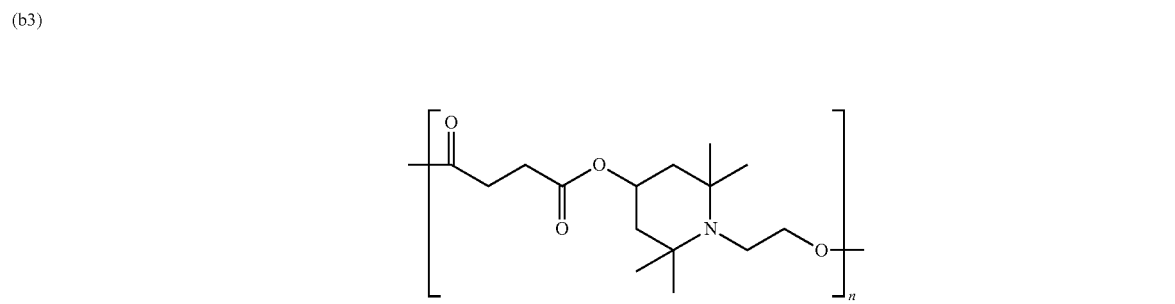 |
| (b4) | 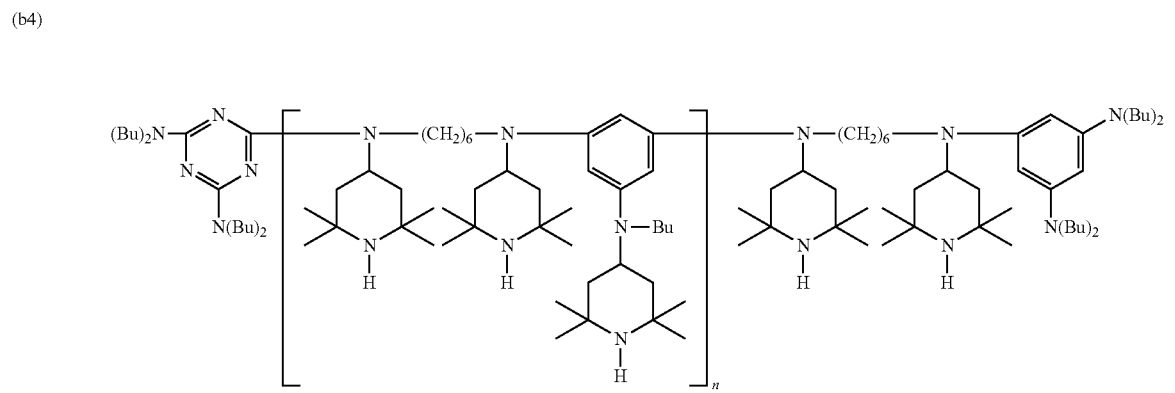 |
| (b5) | 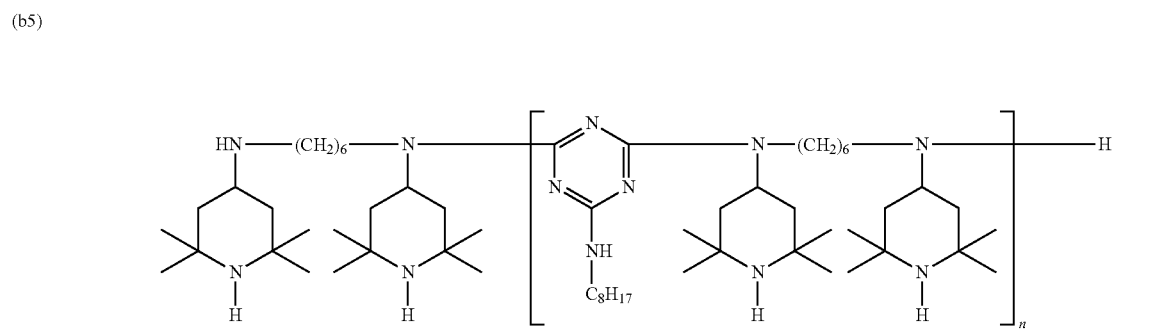 |

TABLE 2-continued

Examples of high molecular weight hindered amine stabilizers

| Formula | Structure |
|---|---|
| (b6) | *structure image* |

The "n" in the formulas (b1) to (b6) of Table 2 indicates the number of repeating units in the high molecular weight hindered amine stabilizer and is preferably greater than or equal to 4. In some embodiments, the high molecular weight hindered amine stabilizer is represented by either Formula (b2) or (b5). More preferably, the high molecular weight hindered amine stabilizer is represented by Formula (b2).

With respect to the antioxidant stabilizer, it can be selected from the group consisting of hindered phenol stabilizers, phosphites esters stabilizers; phosphonite stabilizers and thioether stabilizers. Hindered phenol stabilizers are generally considered as "primary" antioxidants, which can be desirably used in conjunction with "secondary" antioxidants including, but not limited to, phosphite ester stabilizers, phosphonite stabilizers and thioether stabilizers.

Hindered phenol stabilizers are well known in the art and include phenolic hydroxide groups in which the hydroxide substituent is sterically hindered by one or more other groups including, but not limited to, a methyl group, a tertiary butyl group or a combination thereof (see for example *Plastics Additives Handbook*, 5th ed., Hanser, 2001). When present, the total concentration of hindered phenol stabilizers is at least 0.05 wt. %, preferably at least 0.1 wt. %. In some embodiments, additionally or alternatively, the total concentration of the hindered phenol stabilizers is at most 5 wt. %, more preferably at most 3 wt. %, still more preferably at most 2 wt. %, and most preferably at most 1 wt. %. Preferably, the total concentration of hindered phenol stabilizers is from 0.1 wt. % to 1 wt. % stabilizers. Examples of hindered phenol stabilizers are listed in Table 3 below:

TABLE 3

Examples of hindered phenol stabilizers

| Formula | Structure |
|---|---|
| (c1) | *structure image* |

TABLE 3-continued
Examples of hindered phenol stabilizers
| Formula | Structure |
|---|---|
| (c2) | 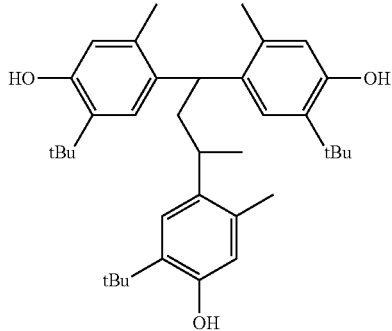 [SMILES: Cc1cc(O)c(C(C)(C)C)cc1C(C)CC(c1cc(C(C)(C)C)c(O)cc1C)c1cc(C(C)(C)C)c(O)cc1C] |
| (c3) | 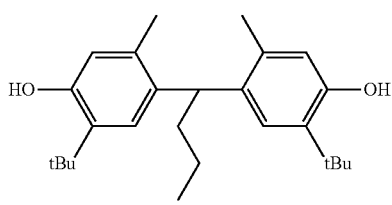 [SMILES: CCCC(c1cc(C(C)(C)C)c(O)cc1C)c1cc(C(C)(C)C)c(O)cc1C] |
| (c4) | 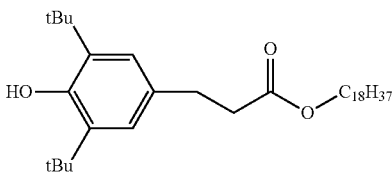 |
| (c5) | 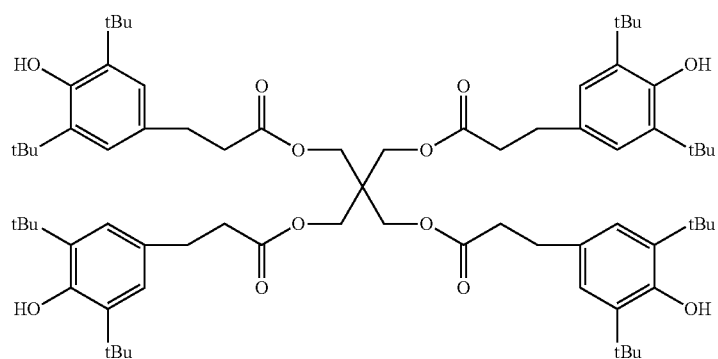 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O] |
| (c6) | 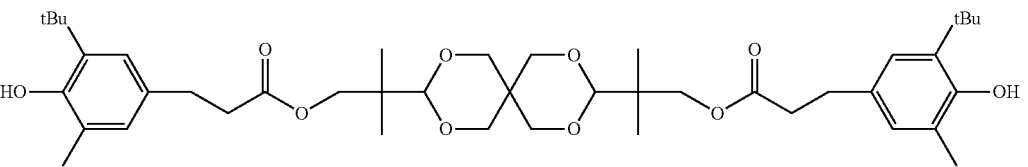 [SMILES: Cc1cc(CCC(=O)OCC(C)(C)C2OCC3(CO2)COC(C(C)(C)COC(=O)CCc2cc(C)c(O)c(C(C)(C)C)c2)OC3)cc(C(C)(C)C)c1O] |

TABLE 3-continued

Examples of hindered phenol stabilizers

| Formula | Structure |
|---|---|
| (c7) | 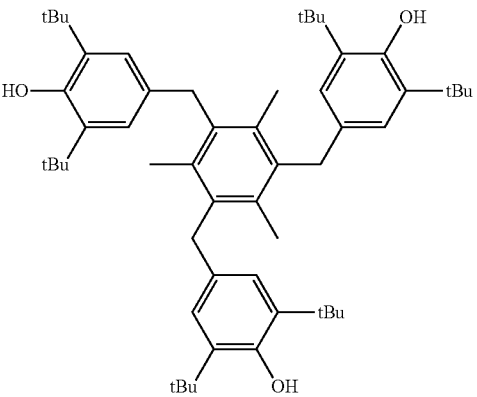 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1] |

In some embodiments, the hindered phenol stabilizer is represented by Formula (c6).

Phosphite ester stabilizers and phosphonite stabilizers (collectively, "phosphorous stabilizers") are respectively represented by the formulae $P(OR)_3$ and $P(OR)_2R$, where R, at each location, is independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety. The phosphorous stabilizers described are also well known in the art and are, for example, listed and detailed in *Plastics Additives Handbook*, 5th ed., Hanser, 2001. When present, the total concentration of phosphorous stabilizers is at least 0.05 wt. %, more preferably at least 0.2 wt. %, still more preferably at least 0.5 wt. %, and most preferably at least 0.8 wt. %, based on the total weight of the composition. In some embodiments, additionally or alternatively, the total concentration of the phosphorous stabilizers is at most 5 wt. %, more preferably at most 3 wt. %, still more preferably at most 2.5 wt. %, even more preferably at most 2 wt. % and most preferably at most 1.8 wt. %. In some embodiments, the total concentration of phosphorous stabilizers was from 0.05 wt. % to 5 wt. %, preferably from 0.2 wt. % to 2 wt. %, most preferably from 0.5 wt. % to 1.8 wt. %. Examples of phosphite ester stabilizers are listed in the Table 4 below

TABLE 4

Examples of phosphite ester stabilizers

| Formula | Structure |
|---|---|
| (d1) | 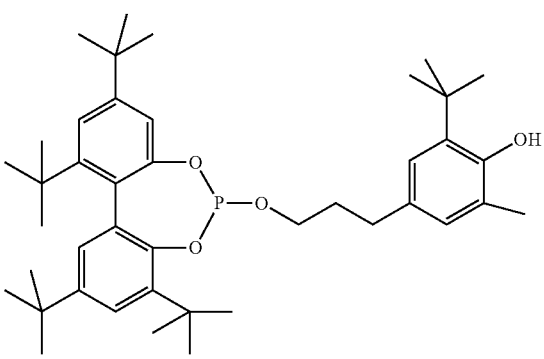 [SMILES: Cc1cc(CCCOp2oc3cc(C(C)(C)C)cc(C(C)(C)C)c3c3cc(C(C)(C)C)cc(C(C)(C)C)c3o2)cc(C(C)(C)C)c1O] |
| (d2) | 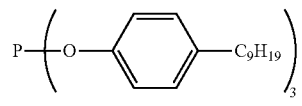 |
| (d3) | 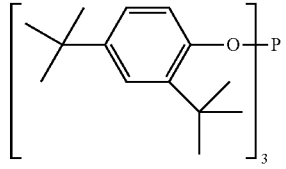 |

TABLE 4-continued

Examples of phosphite ester stabilizers

| Formula | Structure |
|---|---|
| (d4) | |
| (d5) | |
| (d6) | |
| (d7) | |
| (d8) | |
| (d9) | |

TABLE 4-continued

Examples of phosphite ester stabilizers

| Formula | Structure |
|---|---|
| (d10) | |
| (d11) | |
| (d12) | |

In some embodiments, the phosphite ester stabilizer is represented by a formula selected from the group of formulae consisting of Formulae (d5), (d9) and (d12), preferably the group consisting of formulae (d5) and (d0). Most preferably, the phosphite ester stabilizer is represented by Formula (d5).

Examples of phosphonite stabilizers are listed in the Table 5 below

TABLE 5

Examples of phosphonite stabilizers

| Formula | Structure |
|---|---|
| (e1) | |

TABLE 5-continued

Examples of phosphonite stabilizers

| Formula | Structure |
|---|---|
| (e2) | 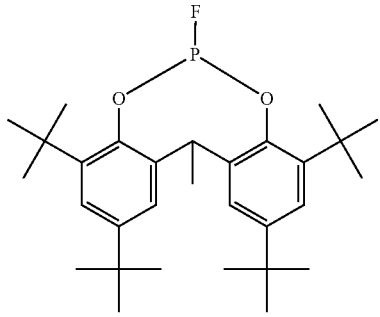 [SMILES: CC1c2cc(C(C)(C)C)cc(C(C)(C)C)c2OP(F)Oc2c1cc(C(C)(C)C)cc2C(C)(C)C] |

Thioether stabilizers refer to organosulfur compounds containing a —C—S—C group and are well known in the art (see for example: *Plastics Additives Handbook,* 5th ed., Hanser, 2001). When present, the total concentration of thioether stabilizers is at least 0.05 wt. %, preferably at least 0.1 wt. %. In some embodiments, additionally or alternatively, the total concentration of the thioether stabilizers is at most 3 wt. %, preferably at most 2 wt. %, more preferably at most 1 wt. %, even more preferably at most 0.5 wt. %, most preferably 0.2 wt. %. Preferably, the total concentration of thioether stabilizers is from 0.1 wt. % to 0.5 wt. % Examples of thioether stabilizers are listed in Table 6 below

TABLE 6

Examples of thioether stabilizers

| Formula | Structure |
|---|---|
| (f1) | 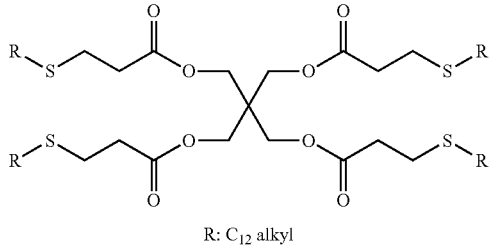<br>R: $C_{12}$ alkyl |
| (f2) | 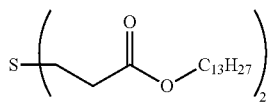 |

Additives

In addition to the polyester polymer and hydroxyapatite, the polyester composition contains a white pigment and, optionally, one or more additives. Suitable additives include, but are not limited to, reinforcing fillers; lubricants; processing aids; plasticizers; flow modifiers; flame retardants; anti-static agents; extenders; and metal deactivators.

In some such embodiments, the white pigment is selected from the group consisting of $TiO_2$, $ZnS_2$, $ZnO$, and $BaSO_4$. Preferably, the white pigment is in the form of particles having a weight-average size (equivalent diameter) less than 5 μm, preferably less than 1 μm. White pigments having a weight-average size of 5 μm may have a deleterious effect on the properties of the polyester polymer composition. In some embodiments, additionally or alternatively, the weight-average size of the white pigment particles is more than 0.1 μm. For clarity, the shape of the white pigment particles is not particularly limited. For example, the particle shape can be, but is not limited to, round, flaky or flat.

The white pigment is preferably titanium dioxide ($TiO_2$). The form of titanium dioxide is not particularly limited and a variety of crystalline forms such as the anatase form, the rutile form, and the monoclinic type can be used. However, the rutile form is preferred due to its higher refraction index and its superior light stability. Titanium dioxide may or may not be treated with a surface treatment agent. Preferably the average particle size of the titanium oxide is in the range of 0.15 μm to 0.35 μm. In preferred embodiments, the surface of the titanium dioxide particles is coated. In some such embodiments, the titanium dioxide is first coated with an inorganic coating and then an organic coating that is applied over the inorganic coating. The titanium dioxide particles may be coated using any method known in the art. Preferred inorganic coatings include metal oxides. Organic coatings may include one or more of carboxylic acids, polyols, alkanolamines, and/or silicon compounds.

In some embodiments, the concentration of the white pigment is at least 1 wt. %, preferably at least 6 wt. %, more preferably at least 8 wt. %, even more preferably at least 10 wt. %, and most preferably at least 15 wt. %. In some embodiments, additionally or alternatively, when present, the concentration of the white pigment is at most 50 wt. %, preferably at most 40 wt. %, more preferably at most 35 wt. %, even more preferably at most 30 wt. %, and most preferably at most 25 wt. %.

With respect to the reinforcing filler, it can be a particulate filler or a fibrous filler. Examples of particulate fillers include, but are not limited to, talc, mica, kaolin, calcium carbonate, calcium silicate, magnesium carbonate and wollastonite. Examples of fibrous fillers include, but are not limited to, glass fiber, synthetic polymeric fiber, aramid fiber, aluminum fiber, titanium fiber, magnesium fiber, boron carbide fibers, rock wool fiber, and steel fiber. Preferably, the reinforcing filler is selected from the group consisting of talc, mica, kaolin, calcium silicate, wollastonite, magnesium carbonate, and glass fiber. Even more preferably, the reinforcing filler is selected from the group consisting of wollastonite, talc, mica, kaolin and glass fiber. In some embodiments, the polyester composition includes a plurality of reinforcing fillers, as described above.

A particular class of fibrous fillers consists of whiskers, i.e. single crystal fibers made from various raw materials such as $Al_2O_3$, SiC, BC, Fe and Ni. Among fibrous fillers, glass fibers are preferred; they include chopped strand A-, E-, C-, D-, S- and R-glass fibers, as described in chapter 5.2.3, p. 43-48 of *Additives for Plastics Handbook*, 2nd ed., John Murphy. Preferably, the filler is chosen from fibrous fillers. Glass fibers may have a round cross-section or an elliptic cross-section (also called flat fibers).

When present, the total concentration of reinforcing fillers is at least 2 wt. %, at least 4 wt. %, still more preferably at least 5 wt. %, and most preferably at least 10 wt. %. In some embodiments, additionally or alternatively, the total concentration of the reinforcing filler is at most 40 wt. %, more preferably at most 30 wt. %, still more preferably at most 25 wt. %, and most preferably at most 20 wt. %. Excellent results were obtained when the concentration of the reinforcing filler was from about 10 to about 20 wt. %.

Light-Emitting Diode Components

Due to the surprisingly improved heat and light aging characteristics and reduction in moisture uptake, the polyester polymer compositions can be desirably incorporated as a component in light-emitting diode ("LED") devices. As used herein, "LED device" refer to a device comprising at least one LED, an electrical connection capable of connecting the LED to an electrical circuit, and a housing partially surrounding the LED. The LED device may optionally have a lens that fully or partially covers the LED.

In some embodiments, the polyester polymer composition can be incorporated into the LED housing, which can optionally include reflectors and reflector plates. In some embodiments, the polyester polymer composition can be overmolded onto metal (such as copper or silver-coated copper) lead frame that can be used to make an electrical connection to an LED inserted into the housing. The LED housing has a cavity in the portion of the housing that surrounds the LED, which serves to reflect the LED light in the outward direction and towards a lens, if one is present. The cavity may be in a cylindrical, conical, parabolic or other curved form, and preferably has a smooth surface. Alternatively, the walls of the cavity may be parallel or substantially parallel to the LED. A lens may be formed over the diode cavity and may comprise an epoxy or silicone material.

In some embodiments, the LED device component can be incorporated into traffic signals, large area displays (including video displays), video screens, interior and exterior lighting, cellular telephone display backlights, automotive displays, vehicle brake lights, vehicle head lamps, laptop computer display backlights, pedestrian floor illumination, and flashlights.

Examples

To demonstrate the surprisingly improved aging performance and reduced moisture uptake, several samples were formed. The each sample included one or more of the following components:

Polyester Polymer: PCT, obtained from Eastman Chemical Company as Eastman™ PCT Polyester White Pigment: $TiO_2$, obtained from Ishihara Sangyo Kaisha Ltd. under the trade name TiPaque PF-691 ("$TiO_2$-1") or TiPaque PC-3 ("$TiO_2$-2")

Stabilizers

Metal Salt Stabilizers: (1) Hydroxyapatite was obtained from Taihei Chemical Industrial Co., Ltd.; (2) $CaHPO_4$, obtained from Taihei Chemical Industrial Co., Ltd.; (3) $Na_4P_2O_7$, obtained from Taihei Chemical Industrial Co., Ltd.; (4) $Al(PO_3)_3$, obtained from Taihei Chemical Industrial Co., Ltd.; (5) $Mg(PO_3)_2$, obtained from Taihei Chemical Industrial Co., Ltd.; (6) $CaCO_3$ obtained under the trade mane Caltex RR from Maruo Calcium Co., Ltd. ("$CaCO_3$-1") (natural and ground $CaCO_3$) or obtained under the trade name Brilliant 1500 from Shiraishi Kogyo Kaisha Ltd. ("$CaCO_3$-2") (synthetic $CaCO_3$)

Mineral Stabilizer: Calcined hydrotalcite ($Mg_{0.7}Al_{0.3}O_{1.15}$), obtained under the trade name KW-2200 from Kyowa chemical Industry Co., Ltd.

Hindered Phenol Stabilizer: Formula (c6), obtained under the trade name ADK STAB AO-80, from Adeka Palmarole;

Thioether Stabilizer: Formula (fl), obtained under the trade name ADK SATB AO-412s from Adeka Palmarole.

Hindered Amine Stabilizer: Formula (a2), obtained under the trade name Nylostab® S-EED® PDR from Clariant Additives LLDPE: Obtained from Dow Chemical Company Reinforcing Fillers: (1) Boron Free E-glass fiber; (2) talc ($D_{50}$=2.5 μm) obtained under the trade name Micro Ace® SG-95 from Nippon Talc Co., Ltd. ("Talc-1"); (3) talc ($D_{50}$=7.5 μm) obtained under the trade name Talc HTP4 from Imi Fabi ("Talc-2"); (4) borosilicate type of glass bead obtained under the trade name Unibeads® UB-02E (D=0 to 45 μm) from Union Co., Ltd. ("Glass Beads")

Plasticizer: di-2-ethylhexanoate

The compositions of comparative examples CE1-CE9 and inventive examples E1 and E2 are displayed in Tables 7-8 below, wherein amounts shown are weight percent, relative to the total weight of the polyester polymer composition.

TABLE 7

| | CE1 | CE2 | CE3 | CE4 | E1 | CE5 | CE6 |
|---|---|---|---|---|---|---|---|
| PCT | 55.2 | 53.2 | 53.2 | 53.2 | 53.2 | 53.2 | 53.2 |
| Talc-1 | 2.0 | 2.0 | 2.0 | 2.0 | 2.0 | 2.0 | 2.0 |
| LLDPE | 0.3 | 0.3 | 0.3 | 0.3 | 0.3 | 0.3 | 0.3 |
| Hindered Phenol Stabilizer | 0.4 | 0.4 | 0.4 | 0.4 | 0.4 | 0.4 | 0.4 |
| Thioether Stabilizer | 0.1 | 0.1 | 0.1 | 0.1 | 0.1 | 0.1 | 0.1 |
| $Ca_3(PO_4)_2$ | | | | | 2.0 | | |
| $Na_4P_2O_7$ | | | 2.0 | | | | |
| $Mg_{0.7}Al_{0.3}O_{1.15}$ | | 2.0 | | | | | |
| $CaHPO_4$ | | | | 2.0 | | | |
| $Al(PO_3)_3$ | | | | | | 2.0 | |
| $Mg(PO_3)_2$ | | | | | | | 2.0 |
| $TiO_2$-2 | 25.0 | 25.0 | 25.0 | 25.0 | 25.0 | 25.0 | 25.0 |
| GF | 17.0 | 17.0 | 17.0 | 17.0 | 17.0 | 17.0 | 17.0 |

TABLE 8

| | CE7 | CE8 | CE9 | E2 |
|---|---|---|---|---|
| PCT | 46.50 | 46.50 | 46.50 | 46.50 |
| $CaCO_3$ - 1 | 8.00 | | | |
| $CaCO_3$ - 2 | | 8.00 | | |
| Glass Beads | | | 8.00 | |
| $Ca_3(PO_4)_2$ | | | | 8.00 |
| Hindered Amine Stabilizer | 0.50 | 0.50 | 0.50 | 0.50 |
| LLDPE | 0.50 | 0.50 | 0.50 | 0.50 |

TABLE 8-continued

|  | CE7 | CE8 | CE9 | E2 |
|---|---|---|---|---|
| TiO$_2$-1 | 27.50 | 27.50 | 27.50 | 27.50 |
| GF | 15.00 | 15.00 | 15.00 | 15.00 |
| Plasticizer | 2.00 | 2.00 | 2.00 | 2.00 |

Mechanical testing was performed as follows. Tensile strength was measured according to ISO 527 with injection molded ISO bars along ISO 294-1, at 5 mm/min of testing speed at 23 degree C. of temperature. The ISO bars had been conditioned under 23 degree C. with 50% relative humidity ("RH") for at least 24 hours. Tensile elongation at yield was measured according to ISO 527 with injection molded ISO bars along ISO 294-1, with an extensometer at 5 mm/min of testing speed at 23 degree C. of temperature. The ISO bars had been conditioned under 23 degree C. with 50% RH for at least 24 hours. Flexural strength was measured according to ISO 178 with specimen cut from ISO bars which were injection molded along ISO 294-1, at 5 mm/min of testing speed at 23 degree C. of temperature. The ISO bars had been conditioned under 23 degree C. with 50% RH for at least 24 hours. Flexural modulus was measured according to ISO 178 with specimen cut from ISO bars which were injection molded along ISO 294-1, at 5 mm/min of testing speed at 23 degree C. of temperature. The ISO bars had been conditioned under 23 degree C. with 50% RH for at least 24 hours.

Water absorption was tested according to ASTM D570. Disks 50.8 mm in diameter and 3.2 mm in thickness were injection molded from the polyester polymer composition. The disks were pre-dried in a hot air oven at 120° C. for 24 hours. The disks were subsequently immersed in distilled water either at 23° C. for 24 hours ("Low T Water Absorption") or at 105° C. for 120 hours ("High T Water Absorption"). Before and after water immersion, weight was measured to calculate water absorption.

Heat and light aging were tested as follows. Testing samples (color chips having the following dimensions: 50 mm×60 mm×2 mm) were injection molded from the polyester polymer composition. After molding, the reflectance of each testing sample was measured. Reflectance was measured at 460 nanometers ("nm"), 540 nm and 620 nm with a BKY-Gardner photo-spectrometer according to ASTM E1331-09 using a D65 illuminant with a 10 degree observer. The testing samples were heat aged by heating them in a hot air oven at a temperature of 160° C. for 8 hours ("First Heat Aging") and then at 260° C. for 10 min. ("Second Heat Aging"). After heat aging, the samples were light aged by heating them at 150° C. and exposing them to light (using an incandescent 400 W 400 F/2 0338 lamp commercially available from Honle UV America Inc. with an Optivex™ UV filter of 3.3 mm thickness commercially available from MH-Strahler). The samples were exposed to light for 352 hours (E1 and CE1 to CE6) or 990 hours (E2 and CE7 to CE9) by attaching to a rotisserie rotating at 2.7 rpm in the oven with a distance of 160 mm from the light bulb. Both after heat aging and after light aging, the reflectance of the testing samples was measured as described above.

Results: Performance of Polyester Polymer Compositions

These results demonstrate the heat and light aging performance, moisture absorption performance and mechanical performance of the polyester polymer compositions.

The results of heat and light aging testing, moisture absorption testing and mechanical testing for samples E1 and CE1 to CE6 are displayed in Table 9. In Table 9, A "High T Water Absorption" value referenced with an asterisk (*) indicates that the corresponding sample developed micro blisters. Additionally, in Table 9, "Relative Change in Reflectance" refers to the percentage change in reflectance after heat and light aging, relative to the initial reflectance.

TABLE 9

|  | CE1 | CE2 | CE3 | CE4 | E1 | CE5 | CE6 |
|---|---|---|---|---|---|---|---|
| Water Absorption and Mechanical Performance | | | | | | | |
| Low T Water Absorption (%) | 0.065 | 0.059 | 0.048 | 0.045 | 0.044 | 0.043 | 0.044 |
| High T Water Absorption (%) | 0.55 | 0.94* | 1.40* | 0.53 | 0.57 | 1.41* | 0.73 |
| Tensile Strength (MPa) | 71.8 | 70.1 | 75.8 | 70.5 | 78.3 | 74.9 | 74.3 |
| Tensile Elongation (%) | 1.19 | 1.07 | 1.29 | 1.13 | 1.30 | 1.20 | 1.17 |
| Flexural Strength (MPa) | 118 | 114 | 117 | 119 | 117 | 117 | 117 |
| Flexural Modulus (GPa) | 6.5 | 7.0 | 6.7 | 7.1 | 6.7 | 6.7 | 6.9 |
| Heat and Light Aging Performance (Retention of Reflectance @ 460 nm) | | | | | | | |
| Initial (%) | 93.66 | 92.34 | 93.23 | 93.77 | 93.62 | 93.20 | 93.62 |
| After Heat Aging (%) | 92.2 | 88.0 | 92.3 | 92.4 | 92.3 | 92.1 | 92.5 |
| After Heat and Light Aging (%) | 82.9 | 86.4 | 86.3 | 83.7 | 85.6 |  | 83.7 |
| Relative Change in Reflectance (%) | 11.5 | 6.4 | 7.4 | 10.7 | 8.6 |  | 10.6 |

For the samples tested, the sample having a hydroxyapatite stabilizer had surprisingly improved heat and light aging performance, relative to the other samples tested that were free of hydroxyapatite. Referring to Table 9, sample E1 (hydroxyapatite) had relative change in reflectance (8.6%) that was lower than that of samples CE1 (no metal salt stabilizer, 11.5%), CE4 (CaHPO$_4$ stabilizer, 10.7%) and CE6 (Mg(PO$_3$)$_2$ metal salt stabilizer, 10.6%). While samples CE2 (Mg$_{0.7}$Al$_{0.3}$O$_{1.15}$ stabilizer) and CE3 (Na$_4$P$_2$O$_7$ metal salt stabilizer) both had decreased relative change in reflectance, respectively 6.4% and 7.4%, compared with sample E1, both CE2 and CE3 had significantly increased moisture absorption, respectively 0.94% and 1.40%, relative to E1 (0.53%), and visible blistering. Furthermore, E1 has increased tensile strength and elongation, relative to all other samples tested, demonstrating the improved mechanical performance in conjunction with the improved heat and light aging properties.

Similar results were observed with heat and light aging testing of samples E2 and CE7 to CE9. A graph containing plots of percent reflectance vs. aging time for samples E2 and CE7 to CE9 is shown in the attached FIGURE. Referring to the FIGURE, E2 (hydroxyapatite), had improved heat and light aging performance over the entire range of heat and light testing, relative to samples CE7 ($CaCO_3$), CE8 ($CaCO_3$), and CE9 (Glass Beads). In the FIGURE, CE9 represents a control sample.

The embodiments above are intended to be illustrative and not limiting. Additional embodiments are within the inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:

1. An LED housing comprising a polyester polymer composition, the polyester polymer composition comprising:
   a polyester polymer comprising, relative to the total number of recurring units in the polyester polymer, at least 50 mol % of a recurring unit ($R_{PE}$), which contains an ester group (C(=O)—O) and is represented by the following formula:

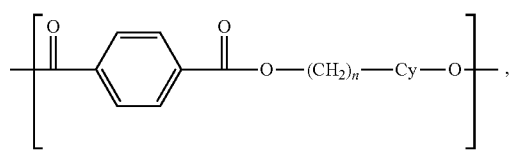

wherein
Cy is a bond or is represented by the following formula

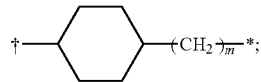

n is an integer from 1 to 12,
m is an integer from 1 to 12; and
"†" indicates a bond to the —$(CH_2)_n$— group and "*" indicates a bond to —O—;
from 1 wt. % to 50 wt. % of a white pigment selected from the group consisting of $TiO_2$, $ZnS_2$, ZnO, and $BaSO_4$;
from at least 1 wt. % to 12 wt. % hydroxyapatite;
from 0.05 to 3 wt % of one or more stabilizers in addition to the hydroxyapatite, selected from the group consisting of light stabilizers, antioxidant stabilizers, and mixtures thereof; and
optionally, one or more additives selected from the group consisting of reinforcing fillers, lubricants, processing aids, plasticizers, flow modifiers, flame retardants, antistatic agents, extenders, metal deactivators and mixtures thereof,
wherein
the polyester polymer composition is substantially free of non-calcium phosphate salts, the expression "substantially free of non-calcium phosphate salts" meaning that the concentration of non-calcium phosphate salts is less than 0.01 wt %; and
wt. % is relative to the total weight of the polyester polymer composition.

2. The LED housing comprising a polyester polymer of claim 1, wherein n=m.

3. The LED housing of claim 1, wherein the white pigment is present at a concentration of at least 10 wt %.

4. The LED housing of claim 1, wherein the white pigment is present at a concentration of at least 15 wt %.

5. An article comprising an LED housing comprising a polyester polymer composition, the polyester polymer composition comprising:
   a polyester polymer comprising, relative to the total number of recurring units in the polyester polymer, at least 50 mol % of a recurring unit ($R_{PE}$), which contains an ester group (C(=O)—O) and is represented by the following formula:

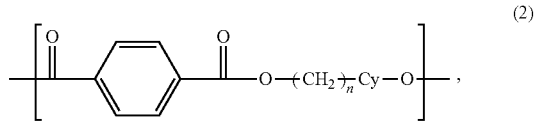

wherein
Cy is a bond or is represented by the following formula

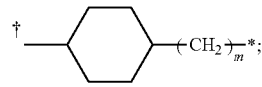

n is an integer from 1 to 12,
m is an integer from 1 to 12; and
"†" indicates a bond to the —$(CH_2)_n$— group and "*" indicates a bond to —O—;
from 1 wt. % to 50 wt. % of a white pigment selected from the group consisting of $TiO_2$, $ZnS_2$, ZnO, and $BaSO_4$;
from at least 1 wt. % to 12 wt. % hydroxyapatite;
from 0.05 to 3 wt % of one or more stabilizers in addition to the hydroxyapatite, selected from the group consisting of light stabilizers, antioxidant stabilizers, and mixtures thereof; and
optionally, one or more additives selected from the group consisting of reinforcing fillers, lubricants, processing aids, plasticizers, flow modifiers, flame retardants, antistatic agents, extenders, metal deactivators and mixtures thereof,
wherein
the polyester polymer composition is substantially free of non-calcium phosphate salts, the expression "substantially free of non-calcium phosphate salts" meaning that the concentration of non-calcium phosphate salts is less than 0.01 wt %;

wt. % is relative to the total weight of the polyester polymer composition; and the article is selected from the group consisting of a cellular telephone display, an automotive display and a laptop computer display.

6. The article comprising an LED housing of claim 5, wherein the white pigment is present at a concentration of at least 10 wt %.

7. The article comprising an LED housing of claim 5, wherein the white pigment is present at a concentration of at least 15 wt %.

8. A polyester polymer composition comprising:

a polyester polymer comprising a recurring unit ($R_{PE}$) that is represented by the following formula:

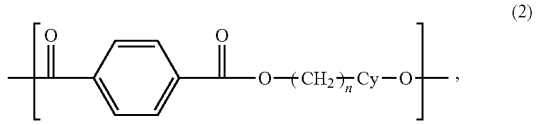
(2)

wherein
Cy is a bond or is represented by the following formula

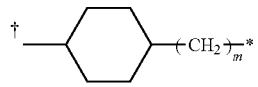

n is an integer from 1 to 12,
m is an integer from 1 to 12; and
"†" indicates a bond to the $—(CH_2)_n—$ group and "*" indicates a bond to —O—;

from 1 wt. % to 50 wt. % of a white pigment selected from the group consisting of $TiO_2$, $ZnS_2$, $ZnO$, and $BaSO_4$;

from 1 wt. % to 12 wt. % hydroxyapatite;

from 0.05 to 3 wt % of one or more stabilizers in addition to the hydroxyapatite, selected from the group consisting of light stabilizers, antioxidant stabilizers, and mixtures thereof; and optionally, one or more additives selected from the group consisting of reinforcing fillers, lubricants, processing aids, plasticizers, flow modifiers, flame retardants, antistatic agents, extenders, metal deactivators and mixtures thereof, wherein the polyester polymer composition is substantially free of non-calcium phosphate salts, the expression "substantially free of non-calcium phosphate salts" meaning that the concentration of non-calcium phosphate salts is less than 0.01 wt %; and wt. % is relative to the total weight of the polyester polymer composition.

9. The polyester polymer composition of claim 8, wherein n=m.

10. The polymer composition of claim 8, wherein the white pigment is present at a concentration of at least 10 wt %.

11. The polymer composition of claim 8, wherein the white pigment is present at a concentration of at least 15 wt %.

12. The polymer composition of claim 8, further comprising a thioether stabilizer with a concentration of at least 0.05 wt %.

* * * * *